Figure 1:
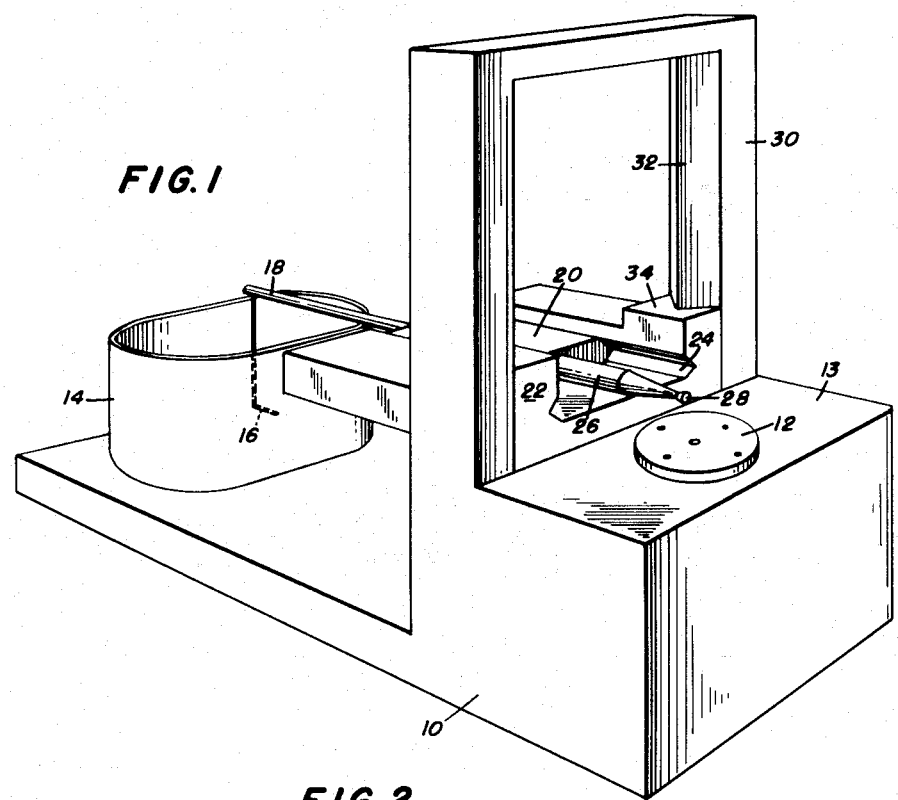

July 26, 1966

G. B. BUSH ETAL 3,263,067

ELECTRICAL ANALOGUE DEVICE FOR PRODUCING
THREE-DIMENSIONAL SURFACES

Original Filed Jan. 27, 1959

3 Sheets-Sheet 1

INVENTORS
GEORGE B. BUSH
LAWRENCE J. VIERNSTEIN

BY

ATTORNEYS

INVENTORS
*GEORGE B. BUSH*
*LAWRENCE J. VIERNSTEIN*

ATTORNEYS

July 26, 1966

G. B. BUSH ETAL 3,263,067

ELECTRICAL ANALOGUE DEVICE FOR PRODUCING
THREE-DIMENSIONAL SURFACES

Original Filed Jan. 27, 1959

3 Sheets-Sheet 3

INVENTORS
**GEORGE B. BUSH
LAWRENCE J. VIERNSTEIN**

BY

ATTORNEYS

United States Patent Office 3,263,067
Patented July 26, 1966

3,263,067
ELECTRICAL ANALOGUE DEVICE FOR PRODUCING THREE-DIMENSIONAL SURFACES
George B. Bush, Trotter Road, Clarksville, Md., and Lawrence J. Viernstein, 4404 Ambler Drive, Kensington, Md.
Original application Jan. 27, 1959, Ser. No. 789,376, now Patent No. 3,099,741, dated July 30, 1963. Divided and this application July 24, 1962, Ser. No. 202,934
4 Claims. (Cl. 235—184)

This invention relates to electric analogue devices and more particularly to analogue devices of the three dimensional type.

This is a divisional application of our copending application Serial No. 789,376, filed January 27, 1959, for "Electrical Analogue," now Patent No. 3,099,741.

It is the primary object of this invention to provide an analogue device for the creation of three dimensional surfaces bearing some relation to a three dimensional field.

It is a primary object of this invention to provide an analogue device for the creation of three dimensional surfaces from stored fields or from some special transform of such fields.

Another object of this invention is to provide an electrical analogue device for three-dimensional mapping of space fields.

Another object of this invention is to provide an electrical analogue device for reproducing three-dimensional surfaces.

Still another object of this invention is to provide an electrical analogue device for producing three-dimensional surfaces in response to boundary value storage arrays.

Another object of this invention is to provide an electrical analogue device for the production of three-dimensional surfaces in response to transformation functions of the parameters of a given surface.

Still another object of this invention is to provide an electrical analogue device for producing surfaces which satisfy partial differential equations and other mathematical functions.

Still another object of this invention is to provide an electrical analogue device which is fully automatic in operation.

Still another object of this invention is to provide an automatic electrical analogue device which may be manually slaved for operation over particular regions of a storage array.

These and other objects of the invention will become apparent from the folowing specification and drawings.

In the following specification reference will be made to equipotential surfaces such as might be generated in an electrolytic tank. This specific reference is convenient to provide a concrete example of the general principle of this invention. However, there are many other kinds of fields that will have utility in this application, such as magnetic or acoustic.

There are many ways to measure some local property of fields. A local property such as gradient, or power level, or a particular component of a vector field, may be used as a scalar measure in a field. "Equipotential" does not have a general enough connotation for three-dimensional surfaces defined by such various scalar measures. A more general word "Monometric" has been chosen for this usage and hereinafter, will be used to define any three-dimensional surface having a particular desired scalar measure.

Basically, the illustrated embodiment operates on the principle that a storage array suspended in a tank of electrolyte with a potential applied thereto, has, in the electrolyte, a plurality of equipotential surfaces surrounding the storage array. If a servo-controlled sensing probe is placed in the tank so as to scan the equipotential surfaces therein and the servo system also controls a cutting head, or the like, in response to the scanning path described by the sensing probe, then the cutting head will produce a surface which is directly analogous to the equipotential surface adjacent the sensing probe.

Figure 2:
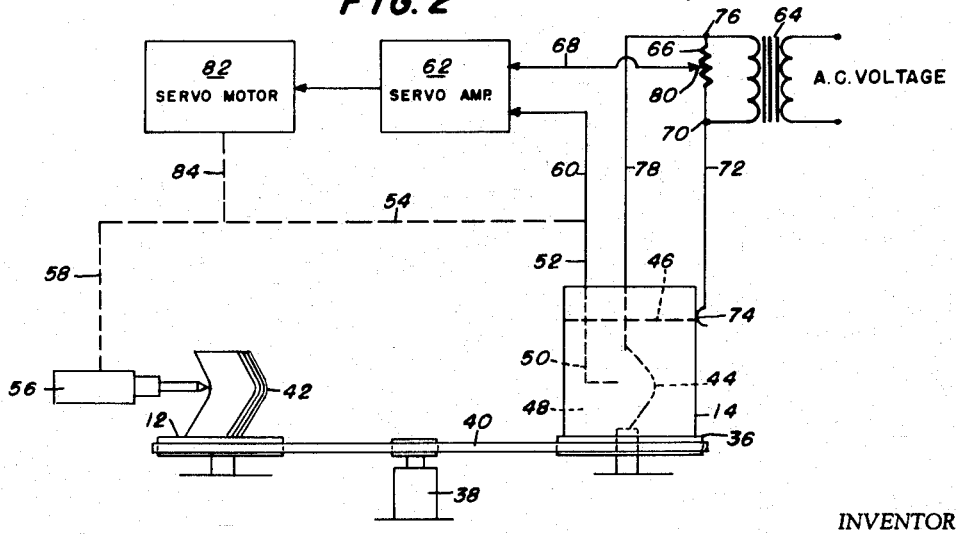
Figure 2A:
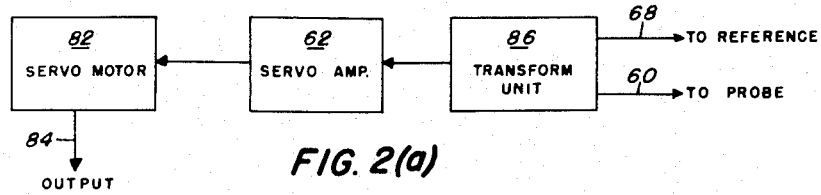
Figure 2B:
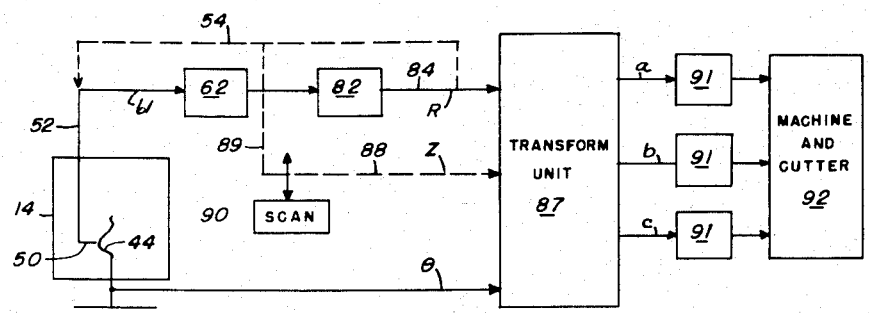
Figure 2C:
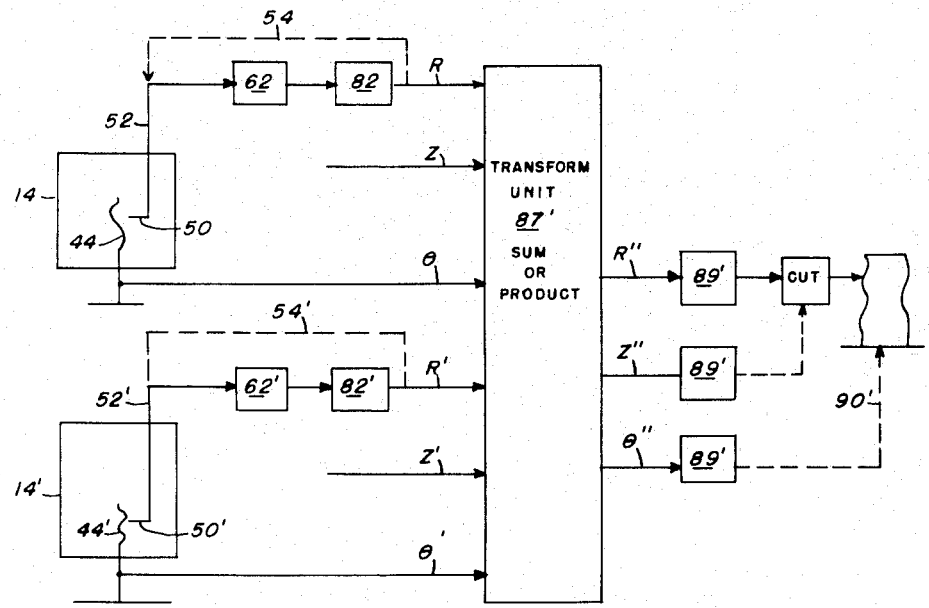
Figure 3:
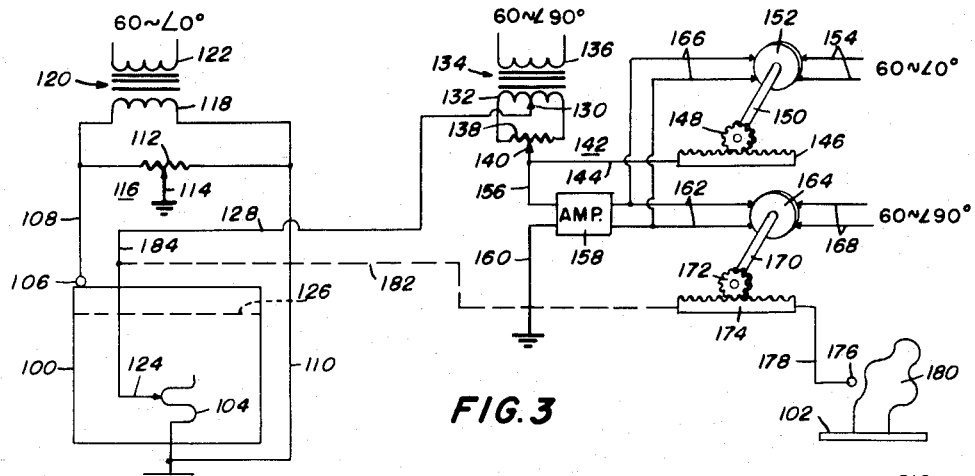
Figure 4:
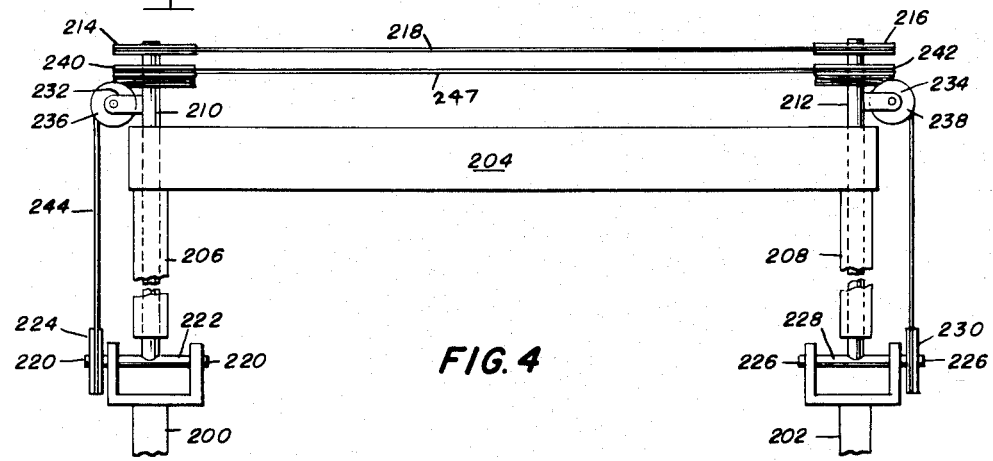
Figure 5:
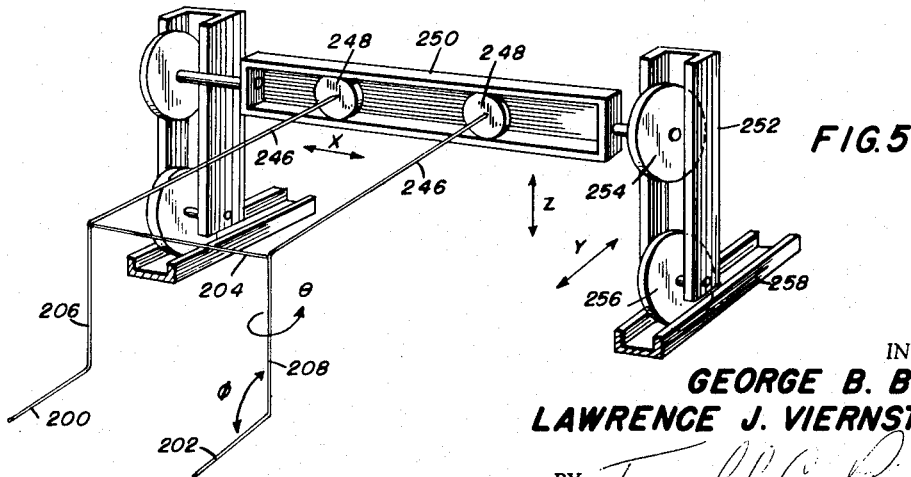

In the drawings:
FIG. 1 shows an oblique view of a possible structural embodiment of the invention;
FIG. 2 shows a simple control system for use with the device shown in FIG. 1;
FIG. 2a shows an embodiment of the control system shown in FIG. 2;
FIG. 2b is an alternate showing of the general representation of FIG. 2;
FIG. 2c is a further embodiment of the device as shown in FIG. 2;
FIG. 3 shows the additional control system used to provide a reactive balance to enhance the performance of the servo shown in FIG. 2;
FIG. 4 shows, in part, a manually operated slaving mechanism which may be used to control the subject device over particular regions of interest; and
FIG. 5 shows a mechanical slaving system incorporating the device shown in FIG. 4.

Referring in detail to the drawings and with particular reference to FIG. 1, the basic structure of a machine embodying the invention is shown as comprising a base member 10 having a rotary work holder 12 mounted on a work table 13 on one end thereof. Mounted on the opposite end of the base member 10 is a field tank 14 having an electrolyte therein. Field tank 14 is mounted on a rotatable face plate 36. A voltage detecting probe member 16 is suspended in the electrolyte in the field tank 14 by means of a travelling support and control arm 18.

The travelling control arm 18 is attached to a horizontally disposed cutter carriage 20 which is capable of controlled motion in a horizontal plane longitudinally of the base member 10. The horizontal cutter carriage 20 is keyed into a vertically movable carriage and track member 22 which has a track surface 24 machined therein for receiving the horizontal cutter carriage 20. A driving shaft 26 having a cutter head 28 thereon extends from the horizontal cutter carriage 20 into the area above the rotary work holder 12 so that the cutter head 28 may be placed in any desired proximity with a work piece on the work holder 12.

A rectangular vertical frame 30 extends above the work table 13. A vertical track 32 is machined into the inner vertical sidewalls of the vertical frame 30. The vertical track 32 cooperates with fitted slot members 34 in the longitudinal sides of the vertically movable carriage 22.

*Basic system of operation*

The basic servo control system for controlling a machine of the type shown in FIG. 1 is shown in FIG. 2. A field tank 14 is mounted on a rotatable face plate 36 which is driven by a drive motor 38 and endless drive belt 40. The drive belt 40 is also connected to the rotary work table 12 on which is mounted a work piece 42 for rotation therewith.

A storage array 44 is mounted on the rotatable face plate 36 in the storage tank 14 on the axis of rotation thereof so that the rotation of the face plate will rotate the storage array 44 and the field tank 14 at the same rate. The storage array 44 is positioned below the surface 46 of the electrolyte 48 in the tank.

A voltage sensing probe member 50 is suspended in the electrolyte 48 below the surface 46 thereof in a position adjacent the storage array 44. The probe member 50 is suspended by a drive link 52 from one end of a common connecting link 54. At the opposite end of the common connecting link 54 is a cutter head 56 suspended therefrom by a drive link 58. The linkage system between the probe 50 and the cutter head 56 causes the cutter head to follow the probe movement in both the vertical and horizontal planes of motion of the probe.

Hereinafter, any reference to the word "cutter" is defined to mean any suitable device for shaping a work surface by material removal therefrom.

The voltage sensing probe 50 is electrically connected by a line 60 to one of the input terminals of a servo amplifier 62 shown in block diagram form. A reference voltage is brought in through a transformer 64, voltage divider 66 across the secondary of the transformer and through a line 68 to the other input terminal of the servo amplifier 62.

One end terminal 70 of the transformer secondary is connected through a line 72 to the outer surface or shell of the field tank 14 by means of a sliding contact 74 which engages the surface of the tank 14. The other end terminal 76 of the tranformer secondary is connected through a line 78 to the source array 44, thus providing a voltage gradient between the source array 44 and the outer shell of the field tank 14. This sets up equipotential surfaces in the electrolyte 48.

By adjusting the variable tap 80 on the line 68 with respect to the voltage divider 66, a reference potential is set up to determine the position of the probe with respect to a particular equipotential surface in the electrolyte 48.

The servo amplifier 62 controls a servo motor 82 which has an output shaft 84 suitably connected in driving relationship with the common connecting link 54 between the sensing probe 50 and cutter head 56.

The linkage 52–54–58 between the cutter head 56 and sensing probe 50 is driven, by a means not shown, in a vertical plane at a predetermined rate to impart a vertical scanning motion to the probe 50 and cutter head 56.

If the position of the probe 50 varies from the desired equipotential surface, which in this case would be a radial deviation with respect to the axis of rotation of the field tank 14 and storage array 44, an error signal appears across lines 60 and 68 at the input terminals of the servo amplifier 62. The output of the servo amplifier actuates the servo motor 82 to drive the common connecting link 54 through means of output shaft 84 to reposition the probe 50 on the selected equipotential surface.

The operation of the system in FIG. 2 is as follows:

A storage array 44 of the desired configuration is mounted at the center of the face plate 36 in the field tank 14 and a workpiece, from which the three-dimensional surface solution to the storage array will be cut, is mounted on the rotating work table 12.

The variable tap 80 on the voltage divider 66 is adjusted for a particular voltage value corresponding to the particular equipotential surface solution desired. The voltage sensing probe 50 and the cutter head 56 are at this time at equal radial distances from the axes of rotation of the face plate 36 and work table 12, respectively.

The sensing probe 50 is electrically connected to one of the input terminals of the servo amplifier 62 while the source array 44 and the outer shell of the field tank 14 are connected across the end points 76 and 70, respectively, of the voltage divider 66.

The drive motor 38 is then started which rotates face plate 36 and drive plate 12 to produce a rotational scan of the equipotential surface chosen relative the sensing probe 50 and a simultaneouss synchronized scan of the work piece 42 relative the cutter head 56, respectively. At the same time, through means not shown, the common connecting link 54, and hence the probe 50 and cutter head, is driven vertically at a predetermined rate by suitable means not shown to effect a vertical scanning of the source array 44 and an identical scan of the workpiece 42. The combined motion of the rotation of the source array 44 with the field tank 14 and the vertical motion of the sensing probe 50 defines a cylindrical scanning surface about the source array 44 concentric with the outer shell of the field tank 14. As indicated hereinbefore, the compound scanning about the source array 44 is duplicated with respect to the workpiece 12.

If an A.C. voltage is now connected across the primary terminals of the transformer 64 an error signal will be generated which is proportional to the radial difference, relative the axis of rotation of the field tank 14 and source array 44, between the position of the voltage sensing probe 50 and the point on the preselected equipotential surface opposite the tip of the sensing probe. This error signal appears between lines 60 and 68 at the input terminals of the servo amplifier 62 which amplifies the signal and produces a proportional output for energizing the servo motor 82. The output response of the servo motor 82 to the output of the servo amplifier is transmitted through the motor output shaft 84 to the common connecting link 54 to produce a radial motion thereof. The shifting of the common connecting link 54 simultaneously moves the sensing probe 50 radially to the proper point on the preselected equipotential surface in the field tank and causes the cutter head to move a corresponding distance into the workpiece. Therefore, the radial dimensions of the work piece are cut to the corresponding radial dimensions of the predetermined equipotential surface.

Thus, it may be seen that when the radial servo-controlled scan described above is superimposed on the compounded cylindrical scan, the necessary parameters for reproducing a three-dimensional equipotential surface are obtainable at every point in every scan cycle and the cutter head 56 operates on the workpiece 42 in such a manner that the surface of the workpiece has the same dimensions as the preselected equipotential surface and the volume of the workpiece is the same as the volume enclosed by that equipotential surface within the range of the scanning motion.

*Transformation of coordinates*

In modern methods of analysis, the use of transformed coordinates to translate a particular coordinate system into another system which is more easily interpreted is practiced extensively.

By ordinary methods the solution of the original system as seen in the transformed system can be extremely laborious unless extensive research has been made to normalize a transformed system to adopt it to all ranges of values. An example of this type of transformed coordinate system in two dimensional relationships is the Smith chart for transmission line analysis. The particular class of transformations involved is known as conformal transformations in that the transformed system preserves some particular physical property of the original coordinate system. In the case of the Smith chart, a rectangular coordinate system is transformed to a polar system wherein the orthogonality of the original parametric functions is maintained.

The transition from the two dimensional case to three dimensional considerations introduces a good deal of complexity. As a matter of example, it might be desired to transform an original system having coordinates $x$, $y$ and $z$ to a system having another set of coordinates $a$, $b$ and $c$. The following equations show relationships of this type relating $a$, $b$ and $c$ to the original coordinates $x$, $y$ and $z$:

$$a = x^2 + 2y^2$$
$$b + y - z + x^{10}$$
$$c = 10z - x - y$$

As can be seen from the above equations, a point by point transformation of the original surface described by $x$, $y$ and $z$ to a working surface described by $a$, $b$ and $c$ would be a monumental task. Rather than solve three simultaneous equations of the above type for each point on a surface, it would be highly desirable to adapt a system, such as hereinbefore described and shown in FIG. 2, to automatically transform the original coordinates to a new set of coordinates.

The above example is one of many possible varieties of transformations. Additional transforms such as a summation of storage arrays, transformation of one coordinate or two coordinates only or infinite series solutions of functions which are discontinuous or non-linear by a step by step or term by term treatment to approach a limit governed by particular boundary values, are possible.

A general block diagram showing of another embodiment of the system of FIG. 2 is shown in FIG. 2(a). A transform unit 86 is placed between the servo amplifier 62 and the error signal connection comprising leads 60 and 68 from the probe 50 and the voltage divider 66, respectively, the latter providing the reference potential which determines the equipotential surface to be traced.

The transformation unit 86, in this case, would add to probe voltage a summation voltage, to be a selected function of the mechanical motion of the servo output 84, as provided by the additional feedback link 53, to produce the desired modification to the radial position of the probe 50 to vary the output response of the servo motor 82 which controls the motion of the cutter head 56 through output shaft 84, common connecting link 54 and drive link 58. Hence, the radial dimensions of the surface cut out on workpiece 42 will be transformed to the desired coordinate function.

In order to effect a complete coordinate transformation, the circular scan of the work table 12 and face plate 36 of the field tank 14 would have to be transformed as well as the vertical scan imparted to the probe 50 and cutter head 56. In the particular modification shown, suitable cams and gears or the like could be utilized to transform the scan of the work table 12 with respect to the face plate 36 and to transform the vertical scan of the probe 50 to a new scan function of the cutter head 56.

The operation of the above described system is similar to that of the system of FIG. 2 with the exception that the scanning motions in the area of the workpiece 42 have been completely transformed from the original scanning motions about the storage array 44 to produce a surface on the workpiece that is mathematically related to but completely transformed from the original shape of the equipotential surface determined by the configuration of the storage array 44.

In conjunction with the description of FIGS. 2 and 2(a), FIG. 2(b) shows a block diagram of a general transform system for transforming the three original coordinates R, Z and θ of the basic cylindrical coordinate system shown to a new set of coordinates a, b and c which have some pre-designated arbitrary functional relationship to the original coordinates.

Referring to FIG. 2(b) the field tank 14 and storage array 44 are mounted for rotation relative to the voltage sensing probe 50 as previously described with respect to FIG. 2. The common connecting link 54 between the output shaft 84 of the servo drive motor 82 and the drive shaft 52 on the probe 50 are also shown. The error signal produced as a function of radial probe position is fed through a line 61 to the input of the servo amplifier 62 to drive the servo motor 82 and produce an output corresponding to the proper value of the radial coordinate at the terminal R on the input side of a suitable coordinate transformation unit 87. Two other input terminals Z and θ are provided for the vertical and rotational coordinates, respectively.

The rotational coordinate θ is picked up at the axis of rotation of the field tank 14 by any suitable transducing means and relayed to the input terminal θ of the transform unit 87 as shown.

The vertical coordinate is shown as being mechanically relayed to the input terminal Z of the transform unit 87 by a transmitting link 88 which is perpendicularly mounted on a vertical drive link 89 connected between a vertical scan controlling means 90 and the common connecting link 54.

The transformed coordinates a, b and c appear at their respectively labelled terminals on the terminals on the output side of the transform unit 87 and through a plurality of servo systems 91 control the cutter head and its associated machine 92.

In FIG. 2(a) the transform unit 86 is shown as being within the servo loop.

In contrast, the system of FIG. 2(b) shows the transform unit 87 as being completely outside of the servo loop to provide a unit having a different response characteristic but the same capabilities.

Another example of coordinate transformations is the product of or summation of a plurality of storage arrays whereby the coexisting boundary values may be incorporated into a series of unique solutions by proper choices of equipotential surfaces.

Referring to FIG. 2(c), an example of a summation or product transformation is shown using two storage arrays. A first field tank 14, storage array 44 and sensing probe 50 are connected as described in FIG. 2(b) to a first set of input terminals R, Z and θ of a summation or product transform unit 87'.

A second field tank 14', storage array 44' and sensing probe 50' are connected in the same way to a second set of input terminals R', Z' and θ' of the product or summation transform unit 87'.

The output side of the transform unit 87' comprises a single set of output terminals R'', Z'' and θ'' which correspond to the transformed radial, vertical and rotational coordinates of the combined storage arrays 44 and 44'. The output coordinate functions R'', Z'' and θ'' are fed to a plurality of servo systems 89' to control the cutter head and associated mechanism 90'.

The new functions R'', Z'' and θ'' may be expressed in the following general manner:

I.—SUMMATION OUTPUT $$R''=f_1(R)+f_2(R')$$
$$Z''=f_3(Z)+f_4(Z')$$
$$\theta''=f_5(\theta)+f_6(\theta')$$

II.—PRODUCT OUTPUT $$R''=f_1(R)f_2(R')$$
$$Z''=f_3(Z)f_4(Z')$$
$$\theta''=f_5(\theta)f_6(\theta')$$

It can be seen from the above description that other direct transformations between two or more functions such as a difference or quotient function could be realized by proper choice of a transform unit of either the analogue or digital type.

*System for use in electrolytes having high dielectric constants*

When the system of FIG. 2 is used in conjunction with field tank electrolytes having good electrical conductivity, the balancing of the error signal by the servo amplifier and servo motor to position the sensing probe with respect to the equipotential surface is a matter of resistive balance only. This is due to the fact that the impedance seen by the probe in the electrolyte has little or no reactive components and a resistive null may be reached in agreement with the preselected value of reference voltage defining the particular equipotential surface of interest.

With the use of an alternating reference voltage and an electrolyte such as water having a high dielectric constant, the probe sees a large capacitive reactance after the resistive null has been reached. As a result, a signal is present at the null which is 90° out of phase with the reference voltage. This phase shifted error signal at the resistive null if left uncompensated, would lead to a degradation of the servo performance. It is therefore necessary to provide a means for bucking out this unwanted signal component to achieve a true balance of the system.

One embodiment of the system for performing the required function is shown in FIG. 3 and comprises a rotary cylindrical field tank 100, adapted to be rotated about the longitudinal axis of the cylinder, which is rotated in synchronism with a rotary work holder 102.

Mounted on the bottom of the field tank 100 is a storage array 104 which is on the axis of rotation of the field tank and rotates with the tank. An electric potential is set up between the outer shell of the field tank 100 and the storage array 104 by means of a sliding contact 106 and corresponding line 108 on the tank shell and a line 110 connected directly to the storage array 104. Lines 108 and 110 are connected to opposite end terminals of a resistor 112 which in combination with a grounded sliding contact 114 comprises a voltage divider generally indicated at 116. The resistor 112 is connected across the end terminals of a secondary winding 118 of a transformer 120. The primary winding 122 of the transformer 120 is used to introduce a voltage, such as sixty cycle A.C. having a phase relation of zero degrees, which voltage is applied between the shell of the field tank 100 and the storage array 104.

The voltage divider 116 is used to provide a reference potential which determines a particular equipotential surface of interest in the field tank 100 between the shell thereof and the storage array 104 by changing the position of the ground connection 114 with respect to the resistor 112.

A voltage sensing probe 124 is submerged in the electrolyte 126 in the field tank 100 between the outer shell of the field tank and the storage array 104 and is adapted to be so positioned that it will follow a particular preselected equipotential surface upon rotation of the field tank 100 and storage array 104. The sensing probe 124 is electrically connected by a line 128 to the center tap 130 of the secondary winding 132 of a second transformer 134.

The primary winding 136 of the second transformer 134 is used to introduce to the system a compensating alternating voltage having a ninety degree phase relation with respect to the input voltage at the primary 122 of the first transformer 120. Connected across the end terminals of the secondary 132 of the second transformer 134 is a resistor 138 which in conjunction with a variable tap 140 forms a voltage divider generally indicated at 142. The variable tap 140 of the voltage divider 142 is mechanically connected through link 144 to a rack 146 which is driven by a pinion 148 on the output shaft 150 of a first servo motor 152.

The first servo motor 152 has field terminals 154 which are energized by an alternating voltage having zero degrees of phase shift with respect to the input voltage across the primary 122 of the first transformer 120.

The variable tap 140 in the voltage divider 142 across the secondary 132 of the second input transformer 134 is electrically connected by means of a line 156 to one of the input terminals of a servo amplifier 158, the other input terminal 160 of the servo amplifier 158 being grounded to provide a connection through ground with the reference potential provided at the ground connection 114 of the first voltage divider 116. Across the output terminals of the servo amplifier 158 are connected the armature terminals 162 of a second servo motor 164. The armature leads 166 of the first servo motor 152 are connected in parallel with the armature terminals 162 of the second servo motor 164. The field terminals 168 of the second servo motor 164 are connected to a source of alternating voltage having a ninety degree phase relation with respect to the energizing voltage at the field terminals 154 of the first servo motor 152.

The output shaft 170 of the second servo motor 164 has a pinion 172 thereon which is in driving relationship with a rack 174. The rack 174 is mechanically connected on one end to a cutter head 176 by means of a driving link 178. The cutter head 176 is positioned adjacent a workpiece 180 mounted on the work table 102 for rotation therewith. The opposite end of the rack 174 is mechanically connected through a common connecting link 182 and a drive link 184 to the voltage sensing probe 124 in the field tank 100, whereby means for controlling the radial scan motion of the sensing probe 124 and cutter head 176 in cooperation with the selected equipotential surface and workpiece 180, respectively, is provided.

In operation, the first voltage divider 116 is adjusted by means of the variable ground connection 114 on the resistor 112 to provide a reference voltage with zero phase shift for selecting the desired equipotential surface set up in the electrolyte 126 in the field tank 100 between the outer shell of the field tank and the storage array 104.

The difference in the position of the sensing probe 124 and the selected equipotential surface is indicated by a proportional voltage on the probe 124 which is transmitted through line 128 to the center tap 130 on the secondary winding 132 of the second input transformer 134. This voltage then passes through the second voltage divider 142 via resistor 138 and variable tap 140 thereon and thence through a line 156 to an input terminal of the servo amplifier 158. The other terminal of the servo amplifier is connected to the ground through ground connection 160 and is therefore at the same potential as the zero phase shift reference voltage determined by the position of the variable ground connection 114 on the first potentiometer 116. Thus, an error signal, which is a function of probe position, appears across the input terminals of the servo amplifier 158.

As a result of the high dielectric constant of the electrolyte 126 in the field tank 100, the error signal has a ninety degree or quadrature component which must be balanced out for optimum servo operation.

When the quadrature component appears across the output terminals of the servo amplifier 158, the first servo motor 152 having a zero phase shift field excitation voltage is energized, the output shaft 150 and the pinion 148 thereon being rotated to drive the rack member 146. The translatory motion of the rack 146 drives the variable voltage tap 140 through a link 144 to change the setting of the second voltage divider 142 which has a ninety degree phase shifted reference voltage across its terminals. The first servo motor 152 remains energized until the quadrature component in the error signal has been balanced out by the proper setting of the second voltage divider 142.

The in-phase component of the amplified error signal energizes the second servo motor 164 which has a ninety degree phase shifted field excitation voltage. The output shaft 170 and pinion 172 thereon drive a rack member 174 which is connected on one end through a common connecting link 182 and drive link 184 to the sensing probe 124 and on the other end to the cutter head 176 via a drive link 178. Thus, the second servo motor acts to drive the sensing probe 124 to a resistive null corresponding to the desired equipotential surface and in doing so positions the cutter head 176 with respect to the workpiece 180. This servoed positioning comprises the radial scan for the three dimensional solution for the preselected boundary conditions of the storage array 104.

The cylindrical scan necessary to complete the solution is effected by the synchronized rotation of the field tank 100 and storage array 104 with the work holder 102 and workpiece 180 and by the synchronous vertical sweep (effected by a suitable mechanism not shown) of the sensing probe 124 and cutter head 176.

*An operator assisted machine for solutions of multivalued functions and areas of instability*

In a great many surface solutions, there are particular regions in which the solution function has discontinuities which are difficult to duplicate or has changes of slope that are so rapid as to introduce instability in the analogue device.

A means for overcoming difficulties of this type is to provide a manually controlled slaving system between the pickup probe and cutter head of the subject machine for examining small difficult regions to complete the general solution with respect to the desired boundary conditions. The radial scan of the probe and cutter would still be servo controlled but a limited angular positioning motion in one plane at a time would be effected by the mechanical slaving unit over a small region of interest. The mechanical slaving means would also be adapted to position the probe and cutter head such that the increment of surface being scanned is normal to the radial scan motion of the servo mechanism to provide smooth cutting.

An example of a mechanical system of the type desired is shown in FIGS. 4 and 5. Referring in detail to FIG. 4, a probe control arm 200 is located at one end of a mechanical system through which it controls the movement of a cutter head control arm 202 at the other end of the system.

The mechanical interconnection system between the probe control arm 200 and the cutter head control arm 202 comprises a main generally rectangular frame member having a longitudinal main supporting section 204 with parallel dependent hollow support members 206 and 208 suspended at right angles therefrom. Rotatably and interiorly mounted with respect to the hollow support members 206 and 208 are a pair of rotary motion transmitting rods 210 and 212 respectively. A pair of fixed pulley members 214 and 216 are mounted on each rotary motion transmitting rod 210 and 212, respectively, on the uppermost ends thereof which extends above the main supporting member 204 and have an endless drive belt 218 therebetween such that one pulley and its associated motion transmitting rod will follow the movements of the other.

The sensing probe control arm 200 is pivoted at diametrically opposed points 220 on a T-shaped bracket 222 which is integral with the lower end of the rotary motion transmitting rod 210. A transmitting pulley 224 is centered at one of the pivots 220 and is fixed to the probe control arm 200 for rotation therewith about the pivots 220.

In a like manner, the cutter head control arm 202 is pivoted at diametrically opposed points 226 on a second T-shaped bracket 228 integral with the lower end of the second rotary motion transmitting rod 212. A receiving pulley 230 is centered at one of the pivots 226 and is fixed to the cutter head control arm 202 for rotation therewith about the pivots 226.

Integral with the rotary motion transmitting rods 210 and 212 at a point between the main support member 204 and the fixed pulley 214 and 216, respectively, are first and second right angle brackets 232 and 234, respectively. On the ends of the right angle brackets 232 and 234 are mounted first and second pairs of guide pulleys 236 and 238, respectively, having their axes of rotation perpendicular to the longitudinal axes of the rotary motion transmitting rods 210 and 212.

Intermediate the first fixed pulley 214 and the first right angle bracket 232 on the first rotary motion transmitting rod 210 is a first idler pulley 240 having its axis of rotation coincident with the longitudinal axis of the first transmitting rod 210.

A second idler pulley 242 is identically mounted on the second transmitting rod 212 intermediate the second fixed pulley 216 and the second right angle bracket 234.

A first endless drive belt 244 runs from the transmitting pulley 224 through one of the pairs of first guide pulleys 236 around the lower groove of idler pulley 240 back over the other one of the pairs of first idler pulleys 236 and back to pulley 224.

An identical arrangement is provided for the receiving pulley 230, second idler pair 238 and lower groove of idler pulley 242 by means of a second endless belt 245.

The upper grooves of idler pulleys 240 and 242 are joined by an endless belt 247. This belt 247 is crossed so that pulleys 240 and 242 have opposite sense of rotation.

In operation, it can be seen that an angular positional setting of the sensing probe control arm 200 is transmitted by the transmitting pulley 224 through the drive belt 244 and interconnecting pulley system described above to the receiving pulley 230 and hence, the same angular positional setting is imparted to the cutter head control arm 202. A rotational position setting imparted to the probe control arm 200 is transmitted through the first rotary motion transmitting arm 210 and the first fixed pulley 214, through the endless drive belt 218 to the second fixed pulley 216, and through the second rotary motion transmitting arm 212 to reproduce the same rotational position setting in the cutter head control arm 202.

Referring to FIG. 5, the above-described probe and cutter positioning device of FIG. 4 is shown in conjunction with a complete mechanical scanning system. The longitudinal main supporting section 204 of the main frame member and the dependent hollow support members 206 and 208 with their respective movably mounted sensing probe control arm 200 and cutter head control arm 202 are mounted as a unit onto a pair of parallel supporting bars 246 attached one on each end of the main supporting section 204.

The parallel supporting bars are mounted for translatory movement in three dimensions indicated by arrows on the drawing as the $x$, $y$ and $z$ directions of a space coordinate system which gives the entire main frame member three degrees of freedom for effecting a three dimensional scan motion. In addition, the sensing probe control arm 200 and cutter control arm 202 as above described in FIG. 4 have two additional degrees of freedom $\theta$ and $\phi$ as shown in FIG. 5 for the purpose of orienting the cutter and probe with respect to the increment of surface to be traced.

The scan motion in the $x$ direction is effected by mounting the parallel supporting bars 246 on rollers 248 in a horizontally disposed track member 250. The horizontally disposed track member 250 is in turn mounted in each end in vertically disposed track members 252 by means of rollers 254 having their axis of rotation along the length of the horizontal track member 250 so that a vertical scan motion may be imparted to the horizontal track 250 and hence, to the parallel supporting bars 246 and the main frame member. The scan motion in the $y$ direction is effected by mounting the vertical track members 252 on rollers 256 in horizontal track members 258 which are perpendicular to the first horizontal track member 250. Thus any three dimensional movement that may be required of the mechanical slaving apparatus may be effected.

Although it has not been shown in FIGS. 4 and 5, the mechanical slaving system is to be used in conjunction with the radial servo control as shown in FIGS. 2 and 3 such that the radial position of the probe with respect to the work is not governed by the operator as the mechanical slaving is primarily for optimum probe-to-surface orientation over a part of the surface still bounded by the initial choice of radial reference. The radial adjustability of the probe and cutter positions with respect to the probe and cutter control arms 200 and 202, respectively, comprises a sixth degree of freedom for the slaving system of FIGURES 4 and 5, the five degrees of freedom $x$, $y$, $z$, $\theta$ and $\phi$ having been previously defined herein.

The above-described system can easily accomplish the objective of stable control over a complex surface in a patch process. The operator performs the function of selecting local patches or areas where the radial servo will be stable, and further selects a probe arm geometry such that the arm does not touch other parts of the work.

There is another useful function which may be made automatic. The cutter will produce the smoothest surface if its rotational axis is normal to the cut surface. If the probe is made as an array of several separate points then it can in association with differential amplifiers sense a departure from normal orientation with respect to the equipotential surface. Therefore, a pair of servo links are provided to so orient the probe array controlled by the differential point voltages, that a local normal be established wiht respect to the equipotential surface. This is done in such a way that only the array swivels with respect to the probe end.

Correspondingly the cutter axis is swivelled with respect to the cuttter tip slaved by the pair of servoes above. The end result being that complex shapes may be made without servo stability problems and with an optimized smooth cutting process.

In order to replace the operator for the functions described above, it would be necessary to orient the pickup orthogonal to the equipotential surface at the point where the probe is located. To do this multiple probe pickups are necessary to measure the field at three or more points in the small local area. By means of servoes the pickup is angularly adjusted in the region until all the probes have the same potential. Since the cutter is slaved, the cutter will be at its best position for cutting, that is perpendicular to the surface that is being cut. As a further aid to smooth automatic cutting the cutter is moved along at a constant rate of speed to remove material at a uniform rate.

As has been described above for previous cases it would be perfectly feasible to insert a coordinate transformation unit of a mechanical type between the transmitting and receiving end of the manual slaving system so that it may be used for analyzing particular regions in a general surface solution which has already been transformed.

*Pure art considerations*

Aside from the use of the invention as a mathematical and analytical tool, the field of aesthetic effects provides an additional forte for the simpler forms thereof.

By the use of suitable storage arrays such as twisted wire, wire outlines, cringled tinfoil and other abstract electrically conductive shapes, an infinite variety of beautiful and appealing shapes and figures may be synthesized.

A few of the countless abstracts made possible by this invention and their corresponding storage arrays are shown in the photographs of FIG. 6. The storage arrays are placed adjacent each abstract to show the amazing end results of reproducing a particular equipotential surface defining a particular storage array. The fact that no prior calculation of the equipotential surface as shown by the shape of the resulting abstract figures is necessary, is equally amazing and indicative of the great versatility of the invention.

As has been shown by the above specification and drawings, the subject invention opens a whole new concept in the field of analysis and its great versatility has such far reaching effects as to take in fields such as pure art and the like.

Commercial applications of the machine in the simplest illustrated form are almost infinite in extent. Some examples are radiation pattern duplication, contour mapping, figure making, waveguide and antenna design, aspheric lens making, mold making for thin walled castings, die sinking, landscaping by remote control of diggers and the like, and the production and analysis of useful shapes in the scientific and mathematical fields.

When combined with transform properties such items as maximum strength structural configurations and aerodynamic and hydraulic surfaces as well as optimum designs in thermal flow applications may be produced.

While the device is described herein as an analogue device for solving three dimensional electric field functions, this does not limit the device to electric fields in that with suitable transducing and generating equipment other space fields such as thermal and acoustic fields may be examined for surface solutions, specifically monometric surfaces.

An example of a machine using an acoustic field would have as its probe a microphone. The "tank" and "storage array" would be some assembly of loudspeakers, baffles, reflectors, and absorbers. The output of the microphone would be balanced against a reference level to control the motion of the servo.

A light field may also be considered. The voltage output of the photo cell would be compared to a reference voltage, the difference being the error voltage input to the probe servo.

For example one can carve the actual three dimensional beam pattern of an antenna from the measure of intensity of the radiation about the antenna. The same can be done by using a loudspeaker as a radiating source of an acoustical field. This field is picked up by a microphone and the amount of pickup governs the position of a cutter. By scanning over the acoustic field with the microphone a cutter slaved to the microphone can be made to cut the shape of the acoustic field intensity into wood or other material. A similar thing can be done by measuring the luminous flux about a light bulb with a photosensitive cell and carving out a solid pattern with a cutter positioned proportionally to the flux distribution pattern. Another example is the carving of a shape identical to the distribution of radiant flux from a hot object measured with a thermocouple or bolometer.

*Auto-avoidance*

When a fully automatic machine with the general properties described is used on a complex shape there may occur a condition where the probe arm (and therefore the cutter arm) would bump into or intersect some other part of the selected equipotential surface. This would be disastrous. As a solution, the probe arm is covered by an array of electrodes. These electrodes are connected to alarm devices which are referenced to the potential of the equipotential surface being cut. The threshold of each alarm corresponds to some protection distance from the equipotential surface being cut. Then the separate alarm devices control the angular disposition of the probe and cutter arms together (without perturbation of probe coordinates) in such a way as to move the arms away from proximity to the cut surface or equipotential surface. In other words the additional pickup devices are used further up on the body of the pickup probe that have the function of sensing the presence of nearby projections. When there is danger of running into such projections the sensing device will pick up sufficient level to actuate the servoes to rotate the body of the probe in such a way as to avoid the projection.

*Duplication*

When the storage array is a real surface in an electrolytic tank, it is possible to pick as the desired equipotential surface, one which is close to the real object. If the separation is made very small then the carving operation produces an object which tends to duplicate the original real surface, the essential feature being that a finite separation provides the linear control region desirable for good servo loop behavior. The accuracy of duplication, as in any other method, is ultimately limited by the tolerances and precision of operation of the machine. Some enhancement to accuracy may be obtained by off-setting the cutter by an amount equal to the offset of the final equipotential surface from the real object. This machine when arranged with an electrolytic tank to create an equipotential surface can be used for duplication of pieces if a potential is chosen that is extremely close to the storage array.

*Mating line carving*

If two parts of a product are to be separately shaped with this invention's method, and if they are to be joined so these surfaces meet, then it is desirable to so arrange the separate shaping operations that the resulting joint is true and smooth.

A method of accomplishing this result is to pick a shape for the mating line first, then use that shape for an electrolytic tank. The potential applied to this electrode must be the same as the potential of the final equipotential surface to be carved. The shaped electrode will then force the otherwise determined field in such a way that the equipotential surface smoothly meets the desired mating line.

While the invention has been described with reference to the specific embodiments shown in the drawings, it is to be understood that these embodiments are for the purpose of example only and are not intended to limit the scope of the invention.

What is claimed is:

1. In a three dimensional analogue computing device, in combination, a probe assembly to sense a scalar value of a three dimensional field region defined by selected boundary conditions, said probe assembly in addition equipped with a plurality of other sensing means to measure the three orthogonal gradients of said scalar field, further means comprising a pair of servo systems controlled separately by two of said gradient measures, said further means acting to control the spatial angular orientation of said probe assembly in a manner to reduce those two gradient measures to zero.

2. In a three dimensional analogue computing device, in combination, a sensing probe having a linear axis of operation, and a driven means having a corresponding linear axis of operation to that of said probe, first control means controllably positioning said probe and said driven means along the respective ones of said linear axes of operation, said linear axes of operation each having a terminal point displaced from said probe and said driven means, respectively, and second control means to move said linear operating axes in first and second angular coordinate directions about the respective ones of said terminal points and adapted to move said terminal points in three coordinate translatory motion, whereby said driven means is slaved to said sensing probe via said first and second control means to follow all possible motions of said probe in six degrees of freedom.

3. The invention defined in claim 2, wherein said combination further includes a three dimensional potential field, said probe being immersed in said field; said first control means comprises sensing means for measuring the potential in said field at the position of said probe, a source of reference potential, and automatic servo means interconnected with and biased by said source of reference potential constraining said probe to a position on said linear axis of operation such that said probe will be in immediate proximity to a three-dimensional equipotential surface in said field defined by a potential equal to said reference potential; and said second control means comprises a manually controlled interconnecting means between said probe and said driven means providing manual control over the first and second angular coordinate directions of said linear operating axes and said three coordinate translatory motion of said terminal points, whereby said driven means will be constrained to execute motion on a three dimensional surface in direct correspondence to the motion of said probe on said three dimensional equipotential surface in said potential field, said probe and said driven means being adapted to be manually oriented with respect to said equipotential surface and said three dimensional surface, respectively.

4. The invention defined in claim 2, wherein said combination further includes a three dimensional potential field, said probe being immersed in said field; said first control means comprises sensing means for measuring the potential in said field at the position of said probe, a source of reference potential, and automatic servo means interconnected with and biased by said source of reference potential constraining said probe to a position on said linear axis of operation such that said probe will be in immediate proximity to a three-dimensional equipotential surface in said field defined by a potential equal to said reference potential; and said second control means comprises additional sensing means measuring the potential gradient at said probe in first and second directions normal to the said linear axis of operation thereof and normal with each other, first and second automatic servo means, respectively, controlling said first and second angular coordinate directions of said linear axis of operation of said probe such that said potential gradients in said first and second directions are constrained to a null value, said linear axis of operation of said probe thereby being oriented normal to the said equipotential surface in all positions of said probe, and manually controlled interconnecting means between said probe and said driven means providing manual control over said three coordinate translatory motion of said terminal points, whereby said driven means will be constrained to execute motion on a three dimensional surface in direct correspondence to the motion of said probe on said equipotential surface.

References Cited by the Examiner

UNITED STATES PATENTS 2,393,974  2/1946  Curry _____ 324—8
2,427,666  9/1947  Felch et al. _____ 324—8

MALCOLM A. MORRISON, *Primary Examiner.*

D. W. DOBYNS, I. KESCHNER, *Assistant Examiners.*